(12) United States Patent
Johnson et al.

(10) Patent No.: US 8,316,976 B2
(45) Date of Patent: Nov. 27, 2012

(54) FRAME FOR A RIDE-ON VEHICLE HAVING A PLURALITY OF BATTERY PACKS

(75) Inventors: Karl Johnson, San Francisco, CA (US); Paul Durkee, San Francisco, CA (US)

(73) Assignee: Mission Motor Company, San Francisco, CA (US)

( * ) Notice: Subject to any disclaimer, the term of this patent is extended or adjusted under 35 U.S.C. 154(b) by 487 days.

(21) Appl. No.: 12/623,348

(22) Filed: Nov. 20, 2009

(65) Prior Publication Data

US 2010/0133030 A1 Jun. 3, 2010

Related U.S. Application Data

(60) Provisional application No. 61/155,774, filed on Feb. 26, 2009, provisional application No. 61/116,570, filed on Nov. 20, 2008, provisional application No. 61/116,578, filed on Nov. 20, 2008, provisional application No. 61/116,590, filed on Nov. 20, 2008.

(51) Int. Cl.
*B60R 16/04* (2006.01)
(52) U.S. Cl. ........................................ 180/68.5; 180/220
(58) Field of Classification Search ............... 180/65.31, 180/65.51, 220, 223, 68.5; 429/99, 37
See application file for complete search history.

(56) References Cited

U.S. PATENT DOCUMENTS

| | | |
|---|---|---|
| 3,590,915 A | 7/1971 | Riedel et al. |
| 4,301,965 A | 11/1981 | Ritter et al. |
| 5,207,288 A * | 5/1993 | Ono .............................. 180/220 |
| 5,416,702 A | 5/1995 | Kitagawa et al. |
| 5,422,558 A | 6/1995 | Stewart |
| 5,487,002 A | 1/1996 | Diller et al. |
| 5,666,040 A | 9/1997 | Bourbeau |
| 5,889,385 A | 3/1999 | Podrazhansky et al. |
| 5,892,346 A | 4/1999 | Moroto et al. |
| 5,898,282 A | 4/1999 | Drozdz |
| 5,965,996 A | 10/1999 | Arledge et al. |
| 6,047,786 A | 4/2000 | Stevenson et al. |
| 6,148,335 A | 11/2000 | Haggard |
| 6,242,873 B1 | 6/2001 | Drozdz |
| 6,326,765 B1 | 12/2001 | Hughes et al. |
| 6,679,345 B2 * | 1/2004 | Hirayama et al. ......... 180/65.31 |
| 6,724,165 B2 | 4/2004 | Hughes |
| 6,899,975 B2 | 5/2005 | Watanabe et al. |
| 7,255,191 B2 | 8/2007 | Baldwin et al. |
| 7,291,422 B2 | 11/2007 | Oogami et al. |
| 7,404,720 B1 | 7/2008 | Frey et al. |
| 7,433,794 B1 | 10/2008 | Berdichevsky et al. |
| 7,625,665 B2 | 12/2009 | Jeon et al. |
| 7,659,029 B2 | 2/2010 | Ota et al. |

(Continued)

*Primary Examiner* — Hau Phan
(74) *Attorney, Agent, or Firm* — Jeffrey Schox (57) ABSTRACT

In one embodiment, the invention is a frame for a ride-on vehicle having at least one front wheel, at least one rear wheel, and a plurality of substantially similar battery packs. The frame defines a central plane and includes a front end located adjacent to the front wheel(s), a rear end located adjacent to the rear wheel(s), and a lattice structure that extends substantially between the front end and the rear end. The lattice structure includes a first portion that includes battery pack mounts that secure a first subset of the battery packs arranged in two layers, and includes a second portion that includes battery pack mounts that secure a second subset of the batter packs arranged in a single layer. The lattice structure also defines a truss that mechanically couples the front wheel(s) to the rear wheel(s).

44 Claims, 11 Drawing Sheets

U.S. PATENT DOCUMENTS

| | | |
|---|---|---|
| 7,816,029 B2 | 10/2010 | Takamatsu et al. |
| 7,855,011 B2 | 12/2010 | Meschter |
| 7,858,224 B2 | 12/2010 | Kim et al. |
| 2001/0000394 A1 | 4/2001 | Whittaker |
| 2003/0016677 A1 | 1/2003 | Mauritz |
| 2003/0033461 A1 | 2/2003 | Malik et al. |
| 2003/0152830 A1 | 8/2003 | Eaves |
| 2004/0080565 A1 | 4/2004 | Vega et al. |
| 2004/0115511 A1* | 6/2004 | Holler et al. ............ 429/37 |
| 2004/0131925 A1 | 7/2004 | Jenson et al. |
| 2004/0238242 A1 | 12/2004 | Honda et al. |
| 2005/0058892 A1 | 3/2005 | Ovshinksky |
| 2005/0062456 A1 | 3/2005 | Stone et al. |
| 2005/0151657 A1 | 7/2005 | Lockhart et al. |
| 2006/0073378 A1 | 4/2006 | Hamery et al. |
| 2006/0149974 A1 | 7/2006 | Rotem et al. |
| 2006/0214641 A1 | 9/2006 | Cho |
| 2006/0286448 A1 | 12/2006 | Snyder et al. |
| 2007/0009787 A1* | 1/2007 | Straubel et al. ............ 429/99 |
| 2007/0080664 A1 | 4/2007 | Maguire et al. |
| 2007/0105010 A1 | 5/2007 | Cassidy |
| 2007/0188147 A1 | 8/2007 | Straubel et al. |
| 2007/0218353 A1 | 9/2007 | Straubel et al. |
| 2007/0252556 A1 | 11/2007 | West et al. |
| 2007/0284953 A1 | 12/2007 | Lyons et al. |
| 2008/0018299 A1 | 1/2008 | Renda |
| 2008/0031468 A1 | 2/2008 | Christoph et al. |
| 2008/0042971 A1 | 2/2008 | Sachs |
| 2008/0072081 A1 | 3/2008 | Helfinstine et al. |
| 2008/0233469 A1 | 9/2008 | Drozdz |
| 2008/0241667 A1 | 10/2008 | Kohn et al. |
| 2008/0280192 A1 | 11/2008 | Drozdz |
| 2008/0311468 A1 | 12/2008 | Hermann et al. |
| 2008/0312782 A1 | 12/2008 | Berdichevsky et al. |
| 2008/0315839 A1 | 12/2008 | Hermann |
| 2009/0113815 A1 | 5/2009 | Woodcock |
| 2009/0123814 A1 | 5/2009 | Cabot |
| 2009/0261785 A1 | 10/2009 | Cabot |
| 2009/0263708 A1 | 10/2009 | Bender |
| 2010/0078246 A1 | 4/2010 | Sasage et al. |
| 2010/0078248 A1 | 4/2010 | Kanno et al. |
| 2010/0216013 A1 | 8/2010 | Kim |
| 2010/0294582 A1 | 11/2010 | Eguchi et al. |
| 2010/0330408 A1 | 12/2010 | Yoon et al. |
| 2011/0070474 A1 | 3/2011 | Lee et al. |
| 2011/0177371 A1 | 7/2011 | Belton |
| 2011/0189521 A1 | 8/2011 | Lee et al. |

* cited by examiner

FRAME FOR A RIDE-ON VEHICLE HAVING A PLURALITY OF BATTERY PACKS

CROSS-REFERENCE TO RELATED APPLICATIONS

This application claims the benefit of U.S. Provisional Application No. 61/116,570 filed 20 Nov. 2008, U.S. Provisional Application No. 61/116,578 filed 20 Nov. 2008, U.S. Provisional Application No. 61/116,590 filed 20 Nov. 2008, and U.S. Provisional Application No. 61/155,774 filed 26 Feb. 2009, which are all incorporated in their entirety by this reference.

TECHNICAL FIELD

This invention relates generally to the ride-on vehicle field, and more specifically to an improved frame for a ride-on vehicle, such as a motorcycle, having a plurality of battery packs.

BACKGROUND

Figures 1, 2:
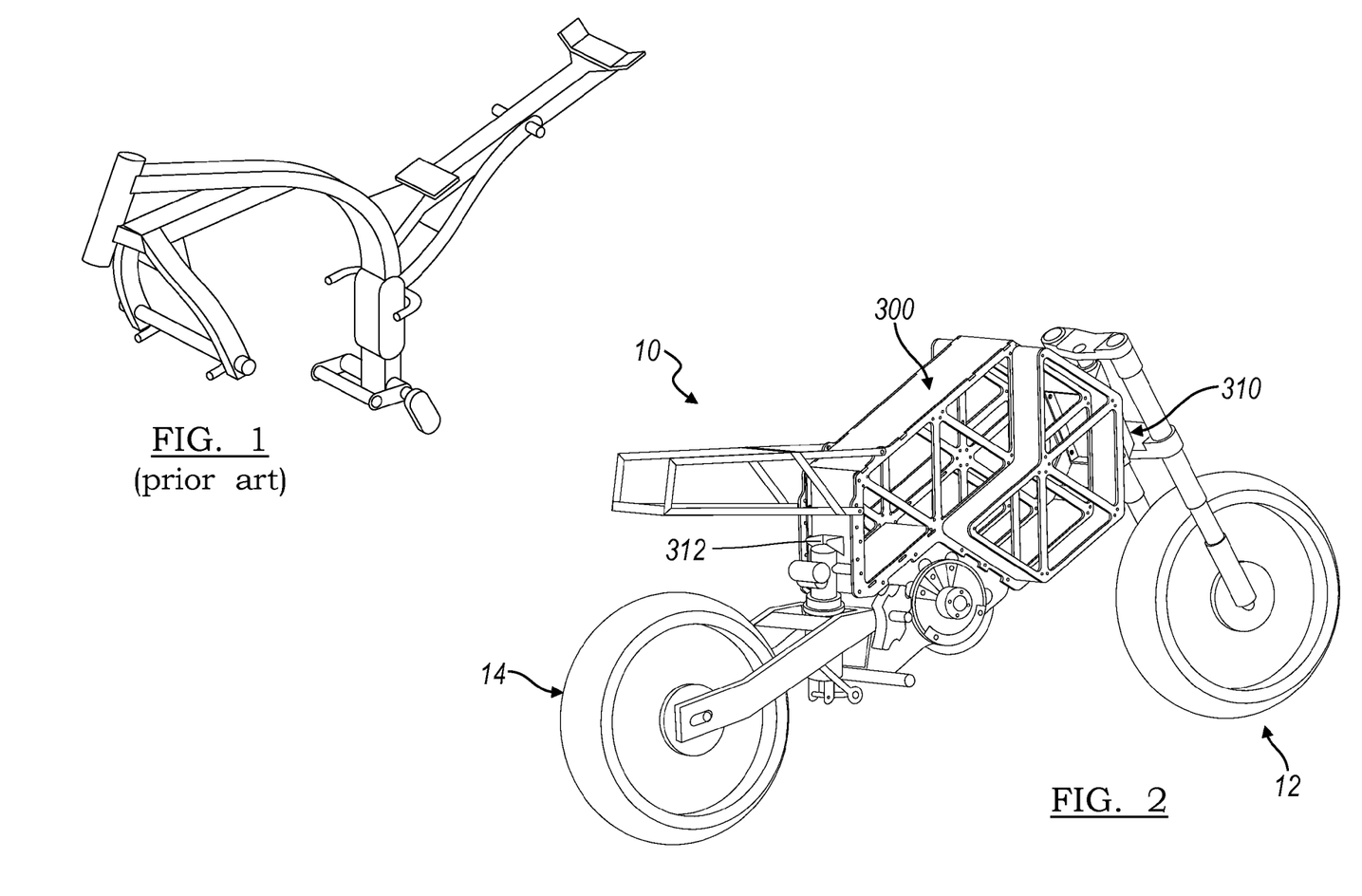
FIG. 1 is a representation of the backbone frame of the prior art.
FIG. 2 is a detailed representation of the frame of the preferred embodiments as applied to a motorcycle.

Within the class of mass-produced batteries, lithium ion batteries have one of the highest energy densities. These batteries, which are most commonly used in laptop computers, are the most cost-effective in a relative small form factor. To create a suitable power supply for electrical transportation needs (in, for example, ride-on vehicles such as all-terrain vehicles, motorcycles, and scooters), relatively large numbers of these cells (on the order of hundreds or even thousands) must be used. Storing hundreds or thousands of cells becomes a very significant size and weight challenge for ride-on vehicles, such as a motorcycle. Conventional frames for motorcycles, such as the backbone frame (as shown in FIG. 1), the perimeter frame, or the trellis frame may provide the structural support necessary in a motorcycle, but do not provide any methods for storing cells. Thus, there is a need to create a frame for a ride-on vehicle having a plurality of battery packs that optimizes performance by increasing battery cell count and providing the necessary structural support necessary with minimal extra weight. This invention provides such frame.

DESCRIPTION OF THE PREFERRED EMBODIMENTS

The following description of the preferred embodiments of the invention is not intended to limit the invention to these preferred embodiments, but rather to enable any person skilled in the art to make and use this invention.

As shown in FIGS. 2-6 with a ride-on vehicle 10 having at least one front wheel 12, at least one rear wheel 14, and a plurality of substantially similar battery packs 100, the frame 300 of the preferred embodiment defines a central plane and includes a front end 310 located adjacent to the front wheel(s) 12, a rear end 312 located adjacent to the rear wheel(s) 14, and a lattice structure 302 that extends substantially between the front end 310 and the rear end 312. The lattice structure 302 includes a first portion 320 with battery pack mounts 304 that secure a first subset of the battery packs 100 arranged in two layers, and includes a second portion 322 with battery pack mounts 304 that secure a second subset of the batter packs 100 arranged in a single layer. The lattice structure 302 also defines a truss 324 that mechanically couples the front wheel (s) 12 to the rear wheel(s) 14.

Figure 3:
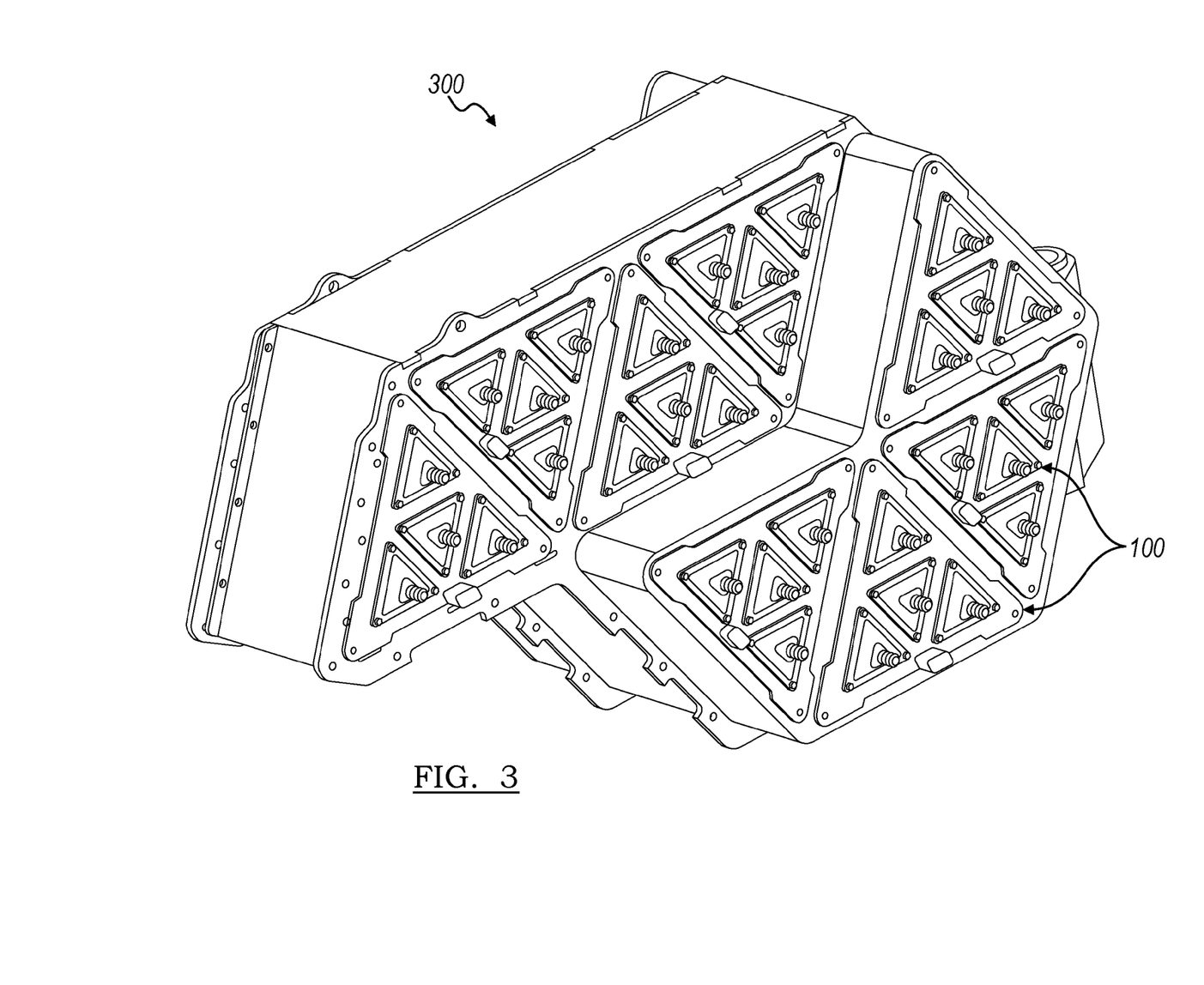
FIG. 3 is a detailed representation of the frame with battery packs.
Figure 4:
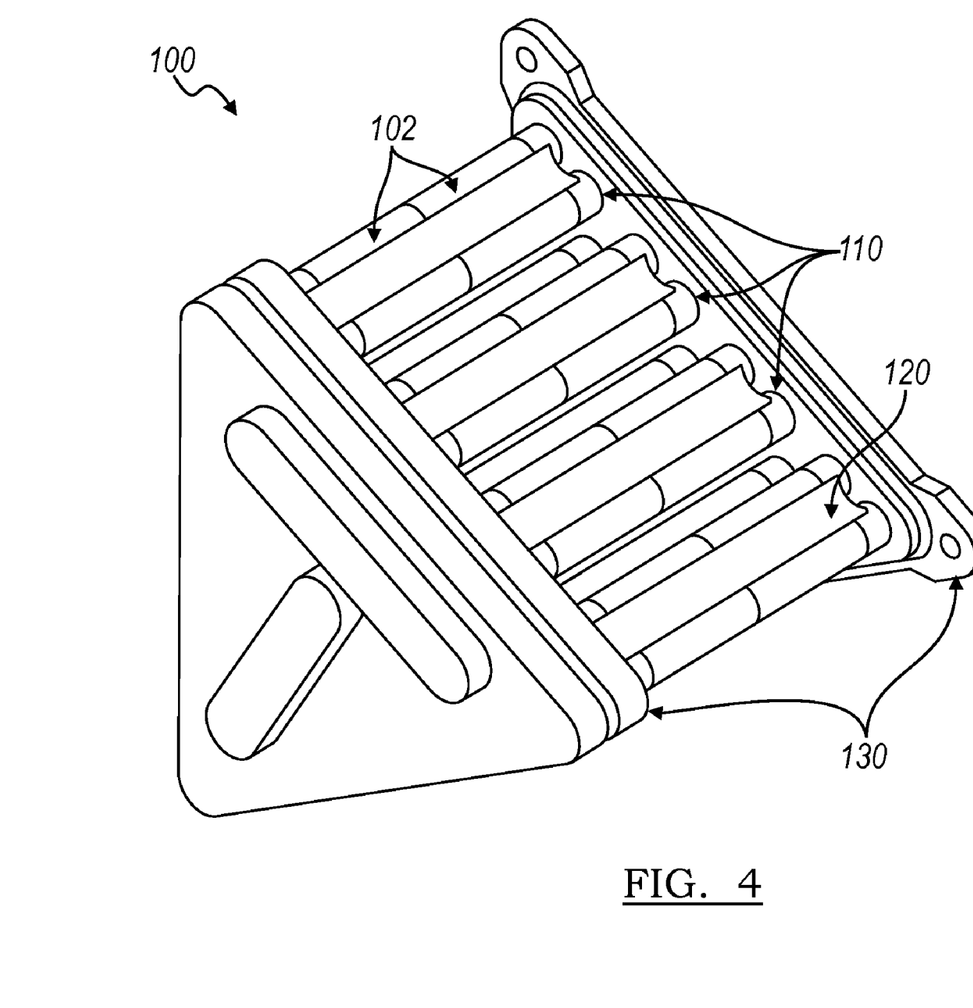
FIG. 4 is a detailed representation of the battery packs in FIG. 3.
Figure 7A:
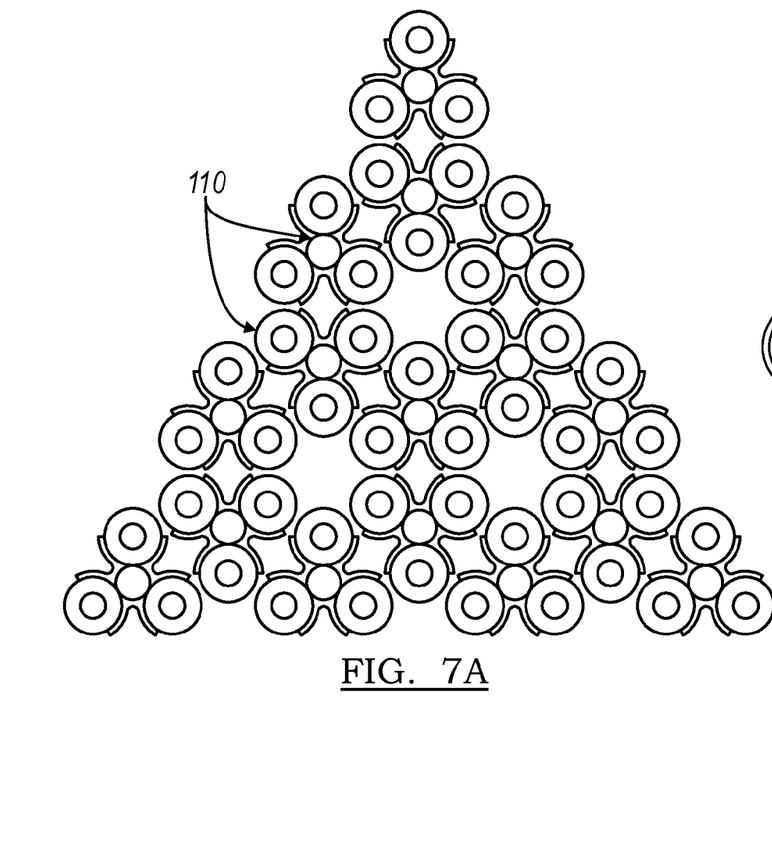
FIGS. 7a and 7b are detailed representations of a first and second variation of modules and arrangement of modules within the battery packs of FIG. 3.
Figure 7B:
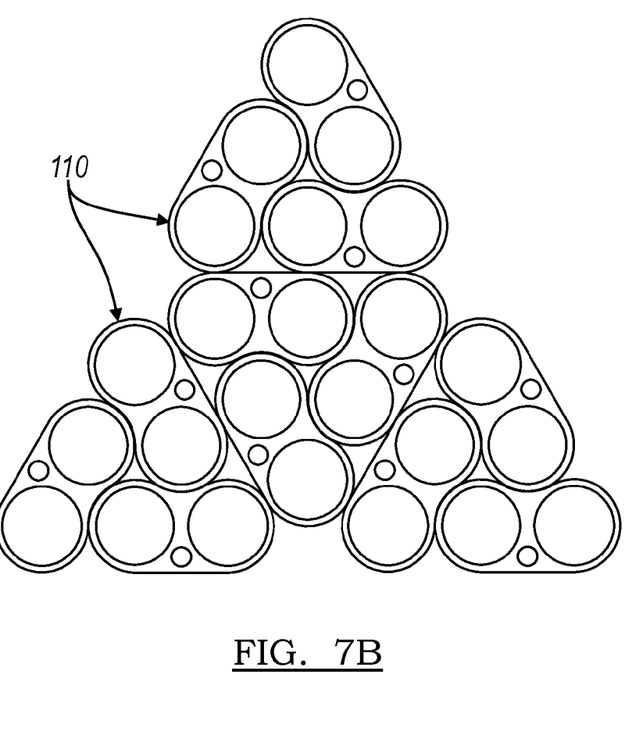

As shown in FIG. 3, the battery packs 100 of the ride-on vehicle are preferably the battery packs described in U.S. Ser. No. 12/623,346 entitled "Battery Pack with Optimized Mechanical, Electrical, and Thermal Management" filed on 20 Nov. 2009, which is incorporated in its entirety by this reference. The battery packs 100 of the ride-on vehicle may, however, be any suitable battery pack. As shown in FIG. 4, the battery pack 100 of the ride-on vehicle includes a plurality of modules 110, two endplates 130, and at least one interface to the fluid source of the thermally conductive fluid of the thermal management system. The battery pack 100 preferably contains sixteen modules no, which each preferably include six cells 102 (for a grand total of ninety-six cells). Each module preferably contains 10% or less of the overall number of cells in the battery pack 100 to facilitate efficient and effective cell management and maintenance. For example, during battery pack operation, if one or more of the modules 110 become inoperable and are turned off, the overall power output of the battery pack 100 is not significantly affected. The modules 110 are preferably arranged into a triangle within the battery pack 100 to conserve space and to form a triangular foundation for the battery pack 100 (shown in FIGS. 7a and 7b and described below). The modules may, however, be arranged with any suitable arrangement.

The endplates 130 of the battery packs 100, which are preferably placed at either end of the battery pack 100, function to integrate the mechanical, electrical, and thermal interfaces of the modules 110. The endplates 130 preferably include a plurality of mounting terminals that function to hold individual modules 110 in place while providing reliable connections with the electrical and thermal management systems. The mechanical, electrical, and thermal interfaces are preferably all integrated within the endplates 130. The endplates 130 also preferably repeat the triangular shape of the overall system for structural advantage. Alternatively, the endplate 130 may be of any other structurally strong shape that accommodates the modules 110, such has a hexagon, diamond, or a square. The mounting terminals within the endplates 130 are preferably geometrically similar to allow for interchangeability between the modules no within the battery pack 100, facilitating continuous battery pack optimization. For example, throughout the life of the battery pack 100, performance characteristics of the modules no may be monitored and recorded to determine optimal operating conditions for each battery module no. Factors that may affect the performance of the module 110 may include location in the battery pack 100, orientation of the module 110 or battery pack 100, neighboring modules no, etc. Alternatively, the terminals may be adapted to fit specific types of modules no that may have optimal performance relative to location within the battery pack 100.

The length of the battery packs 100, as defined from one endplate 130 to the other endplate 130, is preferably optimized for an application in a ride-on vehicle 10. The length of battery pack 100 (known as "one layer") is preferably set at the distance between the rider's legs on the ride-on vehicle. This allows a single layer of battery packs to be used at the second portion 322 of the lattice structure 302 where the rider's body may need clearance for their legs or any other portion of their body. Where clearance is not necessary for the rider (at the first portion 320 of the lattice structure 302), a double layer of battery packs 100 is preferably used to increase the available portable power for the motorcycle. Alternatively, the length of the battery packs 100 may be one half (or slightly less than one half) of the distance between the rider's legs on the ride-on vehicle, allowing two layers of battery packs 100 to be used at the second portion 322 and four or any other suitable number of layers to be used in the first portion 320. However, the length of the battery packs 100 may be of any other suitable length. The overall arrangement of battery packs in the frame relative to the rider or the vehicle may also be adjusted by adjusting the geometry and layout of the frame. This arrangement utilizes the modularity and optimized geometry of the battery pack 100 to maximize the total number of cells 102 that can be included into the ride-on vehicle. The battery packs 100 preferably have a geometry and size that matches the geometry and size of the battery pack mounts 304 to increase the packing efficiency of the battery packs 100 (and subsequently cells 102), within the battery pack mounts 304 (and subsequently in the frame 300).

Figure 5:
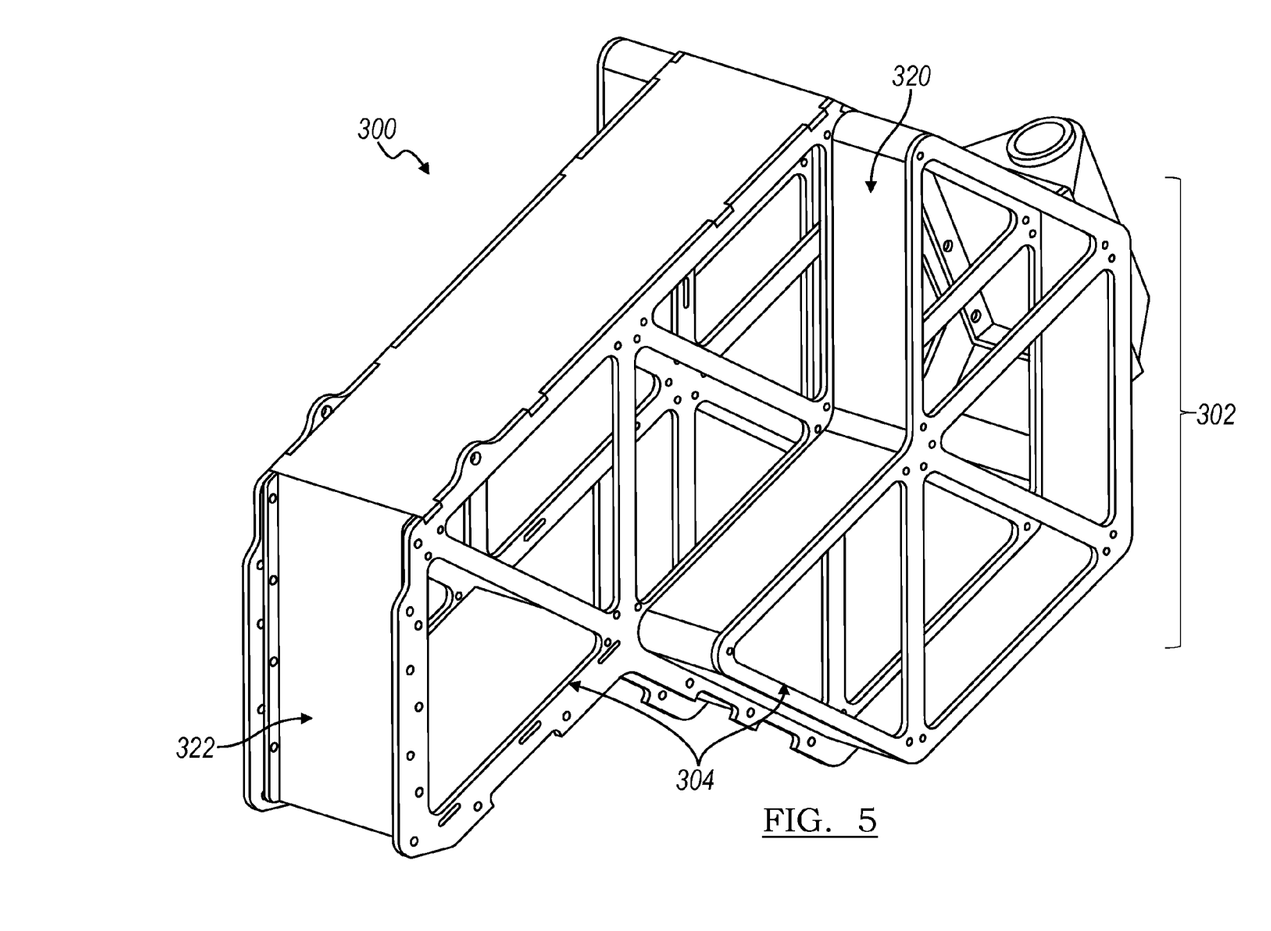
FIGS. 5 and 6 are an isometric view and side view, respectively, of the frame.
Figure 6:
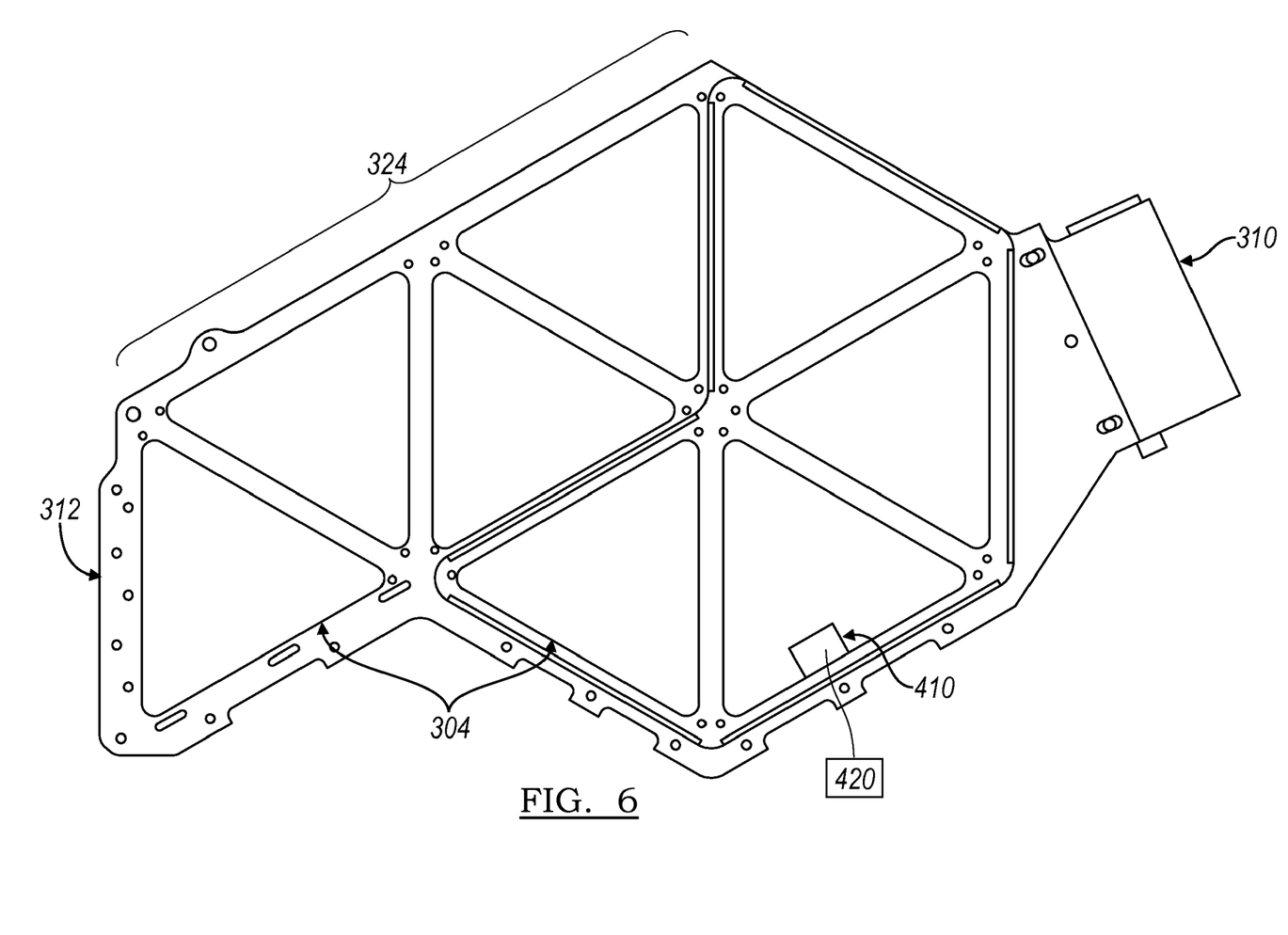

As shown in FIGS. 5 and 6, the frame 300 of the preferred embodiment includes a front end 310 that is located adjacent to the front wheel and/or steering head of the ride-on vehicle (front wheel connection) and a rear end 312 that is located adjacent to the rear wheel and/or swing arm (rear wheel connection) of the ride-on vehicle. The lattice structure 302 preferably forms a truss 324 that mechanically couples the front wheel to the rear wheel and provides the structural support necessary to substantially maintain the relative position between the front wheel and the rear wheel during use of the ride-on vehicle. The overall lattice structure 304 is preferably mechanically optimized to withstand compressive, tensile, and torsional loads. The lattice structure 304 may also be optimized to withstand any other type of loading that a ride-on vehicle may experience.

Figure 10:
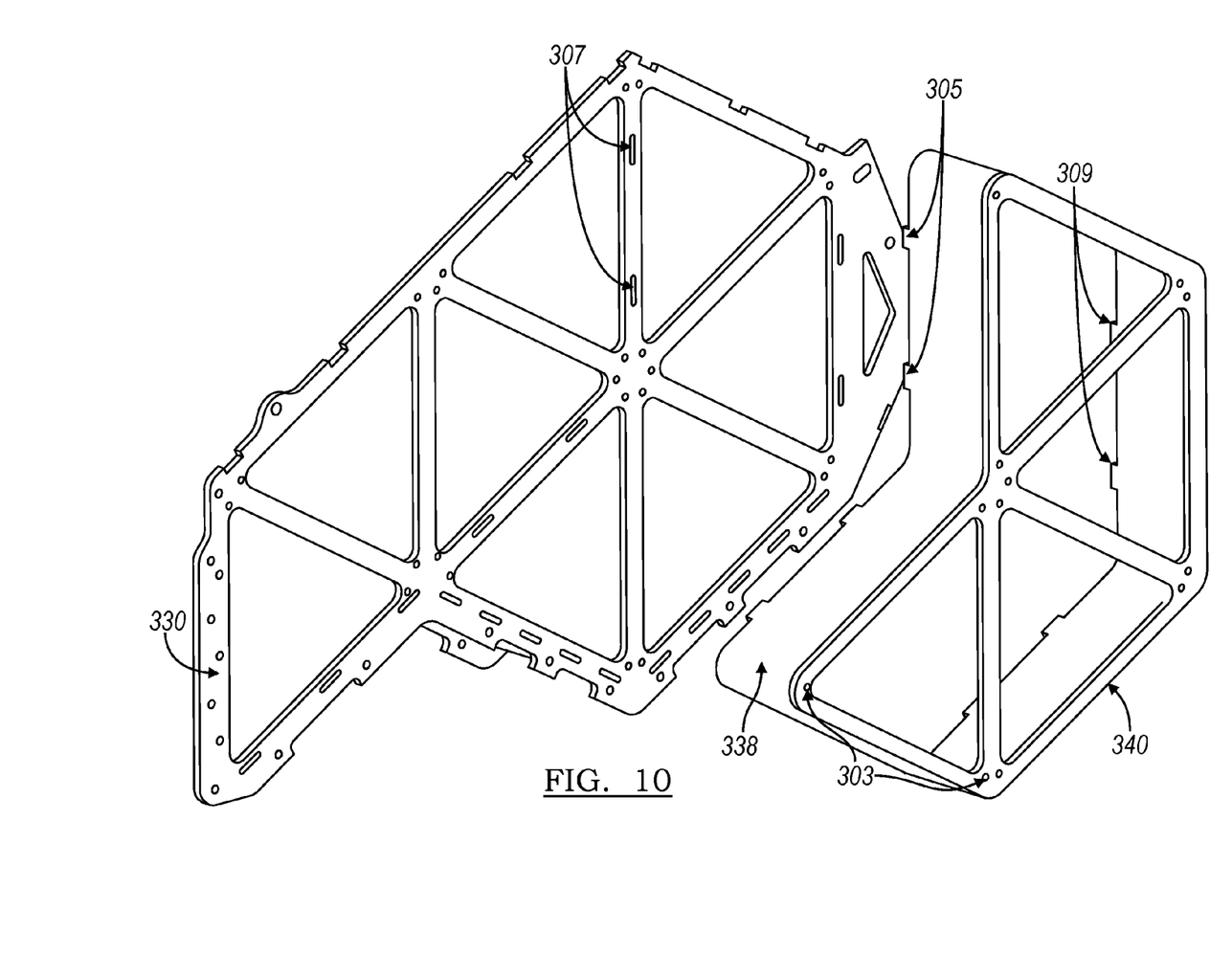
FIG. 10 is a detailed view of the locating and mounting features of the primary and secondary lattice structures of the frame.
Figure 11:
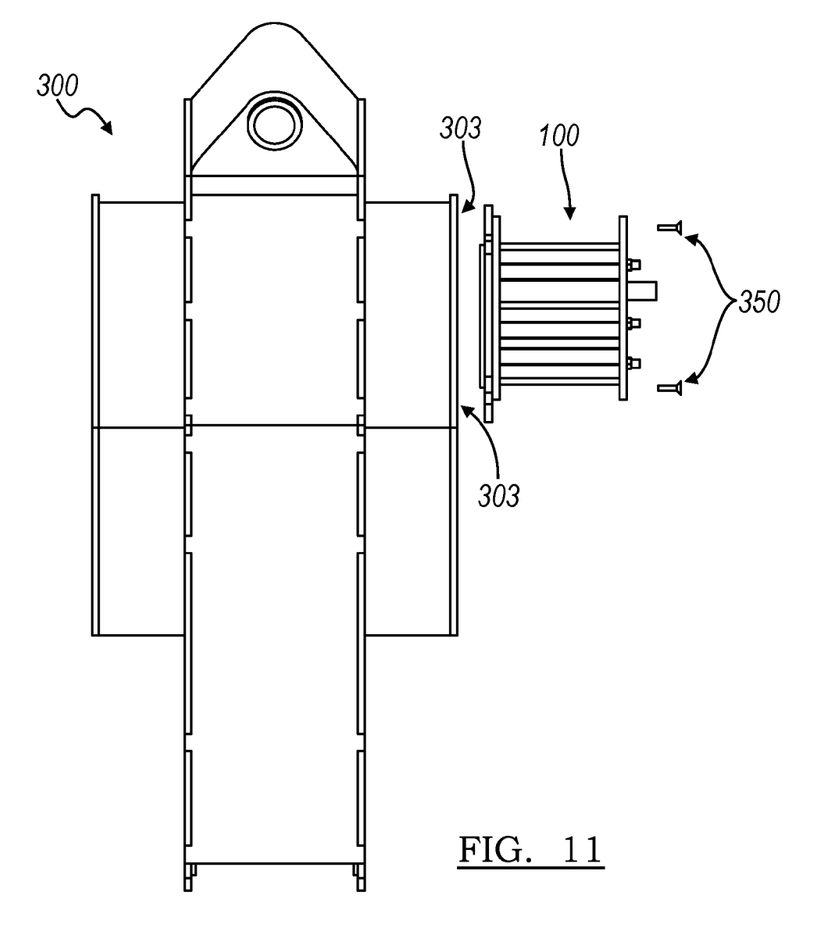
FIG. 11 is a detailed view of a method of aligning and securing a battery pack to the frame of the preferred embodiments from a top view.

The lattice structure 302 functions to define the battery pack mounts 304 (which can also be considered cavities or enclosures) for the battery packs. The battery pack mounts 304 function to align and secure the battery packs. The battery pack mounts 304 preferably align and secure the battery packs transversely relative to the central plane of the frame 300 and substantially parallel to the ground. The lattice structure 304 includes a first portion 320 that includes battery pack mounts 304 that secure a first subset of the battery packs arranged in two layers, and includes a second portion 322 that includes battery pack mounts 304 that secure a second subset of the battery packs arranged in a single layer. The battery pack mounts 304 of the first portion 320 preferably orient two layers of battery packs transversely relative to the central plane and parallel to the ground in opposing directions. The battery pack mounts 304 of the second portion 322 preferably orient a single layer of battery packs transversely relative to the central plane and parallel to the ground in one of the two opposing directions of the battery packs of the first portion. The battery pack mounts 304 of the second portion 322 may alternatively orient a single layer of battery packs transversely relative to the central plane and parallel to the ground in alternating directions. However, the battery pack mounts 304 may align and secure each battery pack in any suitable orientation or combination of orientations. The lattice structure 302 preferably also functions to define aligning and securing features for each battery pack that are located at each battery mount 304. As shown in FIGS. 10 and 11, the aligning and securing features are preferably bores or threaded holes 303 that accommodate to bolts or screws 350 that align and secure the battery pack 100 to the battery mount 304. However, each battery mount 304 may include slots, tabs, or any other suitable aligning feature, and latches, snaps, or any other suitable securing feature.

As shown in FIGS. 5 and 6, the battery pack mounts 304 preferably correspond to the battery packs 100. As discussed above, the battery packs 100 are preferably of a triangular shape and, thus, the battery pack mounts 304 are preferably also of a triangular shape. Since the lattice structure 302 defines the cavities or openings for the battery pack mounts 304, the triangular shape of the battery pack mounts 304 defines the triangular tessellation of the lattice structure 302. With this preferred frame 300, the ride-on vehicle of the preferred embodiment optimizes performance by increasing battery cell count and providing the necessary structural support necessary with minimal extra weight. The tessellation of the triangular shape allows for a high packing efficiency of the battery packs within the frame 300. The lattice structure 302 of the frame 300 defines a volume within the frame 300 and a significant portion of the defined volume is occupied by battery packs 100 that are aligned and secured to the frame by the battery pack mounts 304. In the preferred embodiments, at least 50%—and more preferably 75%—of the volume defined by the lattice structure 302 is occupied by battery packs 100. This high packing efficiency leads to an increased count of battery cells within the ride-on vehicle. The tessellation of the triangular shape also allows for a relatively high strength for the frame 300 and the ride-on vehicle. As used in bridges and other mechanically strong structures, the triangular truss structure 324 provides mechanically and weight optimized structural support for compressive, tensile, and torsional loading while being lightweight. In the preferred embodiment, the frame 300 encounters such types of loading during the use of the vehicle and, thus, the incorporation of the triangular truss structure 324 within the frame 300 provides a significant mechanical advantage to the frame. In addition, the inherent structural efficiency of the triangular truss structure 324 allows elimination of excess material and provides a significant reduction in frame weight. Alternatively, a locally mechanically and weight optimized combination of shapes and trusses may be incorporated into the truss to best receive local loading conditions seen during use of the ride-on vehicle.

In the motorcycle variation of the ride-on vehicle, as shown in FIG. 2, the triangular truss 324 may also optimize placement of battery packs relative to the rider and the other motorcycle components (steering, suspension, motor, etc). Unlike the automobile, which uses more perpendicular lines (typically vertical and horizontal), the overall shape of a conventional motorcycle incorporates many angled lines. As a result, using the triangle as the fundamental shape in a frame of a motorcycle allows the frame to accommodate to both the user and the main elements of a motorcycle, in particular, the steering head, the swing arm, and the two wheels 12 and 14. Thus the repetition of the triangle for mechanical and weight optimization in the frame 300 yields an efficient use of available space of the motorcycle. Alternatively, other tessellating shapes may be used.

Figure 8:
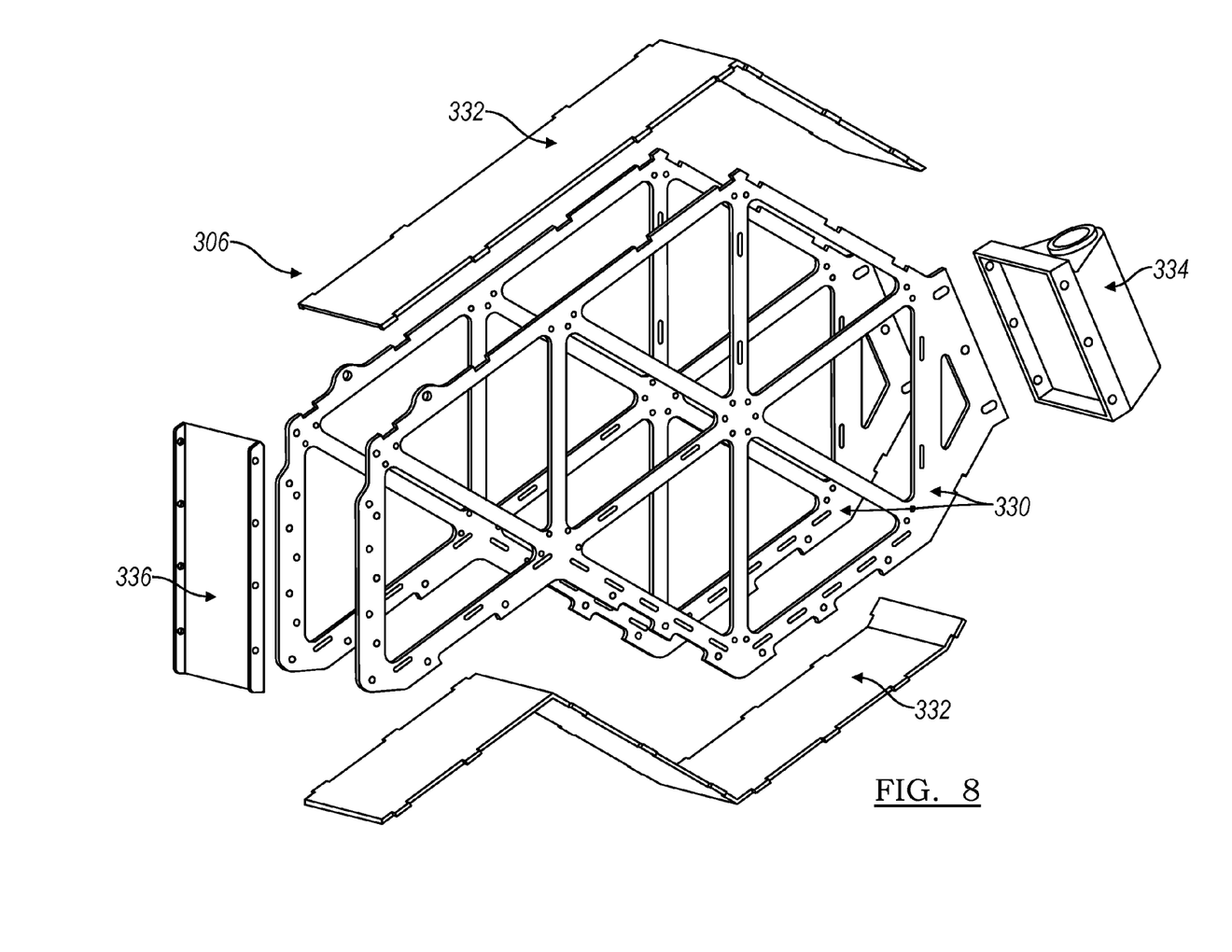
FIG. 8 is an exploded view of the primary lattice structure of the frame of the preferred embodiments.
Figure 9:
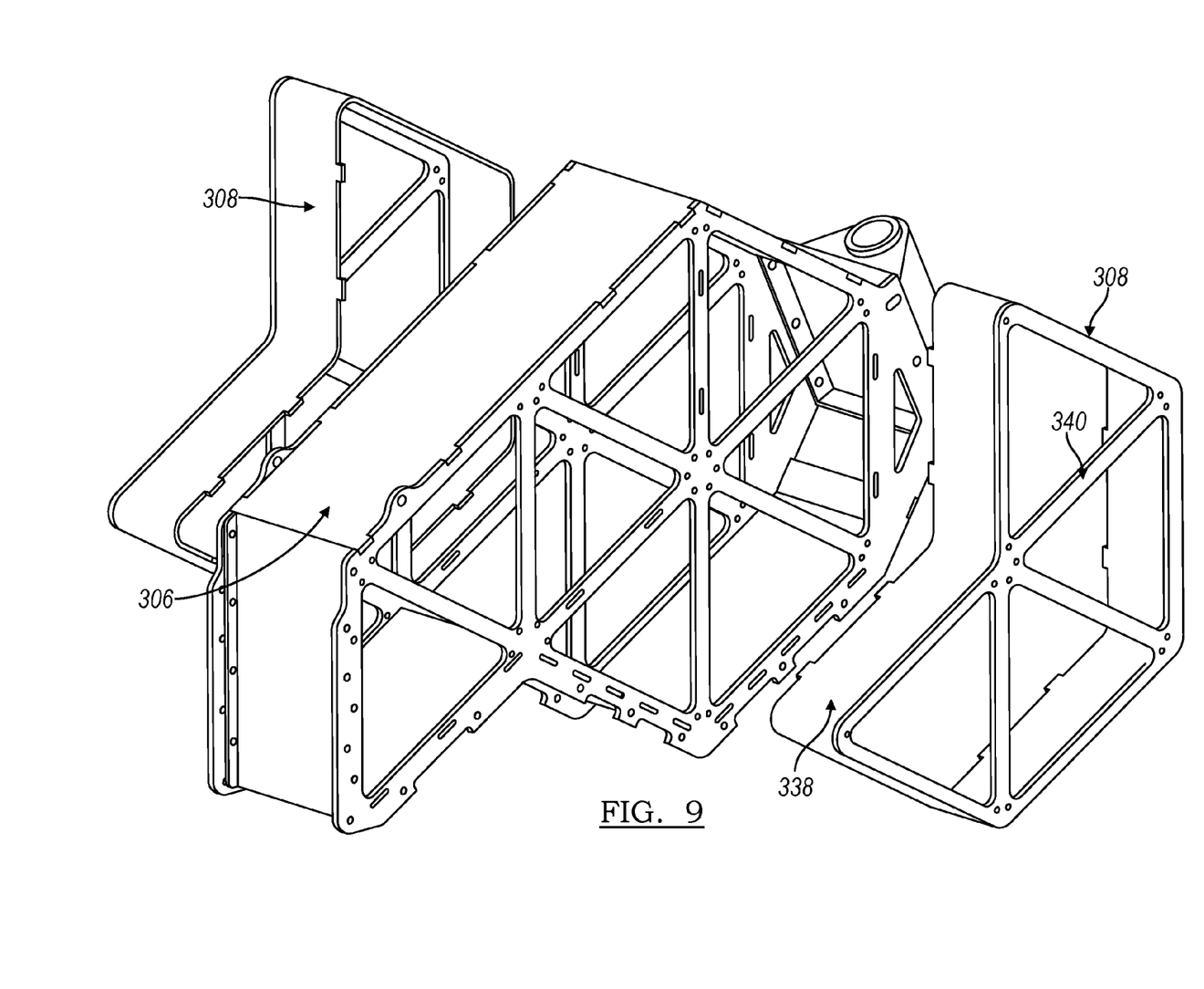
FIG. 9 is an exploded view of the secondary lattice structure with the primary lattice structure of the frame.

As shown in FIGS. 8-10, the lattice structure 302 preferably includes a primary lattice structure 306 and a secondary lattice structure 308 that is coupled to the primary lattice structure 306 at the first portion 320. The primary lattice structure 306 and the secondary lattice structure 308 cooperate to align and secure two layers of battery packs at the first portion 320, and to align and secure a single layer of battery packs at the second portion 322. The primary lattice structure 306 is preferably appended with secondary lattice structure 308. The primary lattice structure 306 preferably includes two main faces 330 and a side face 332. The primary lattice structure 306 may also include a front coupling 334 located at the front end 310 that that couples to the steering head and a rear coupling 336 located at the rear end 312 that couples to the swing arm. The secondary lattice structure 308 preferably includes two segments, each coupled to the main lattice structure on opposite sides of the central plane and each including a secondary side face 338 and a secondary face 340. As shown in FIG. 5, the primary lattice structure 306 and the secondary lattice structure 308 cooperate to form an overall width of the lattice structure 304 at the first portion 320 that is approximately twice the width of the lattice structure 304 at the second portion 322, allowing twice the number of layers of battery packs 100 to be aligned and secured at the first portion 320 than the second portion 322.

The primary and secondary lattice structures 306 and 308 may include locating and mounting features to facilitate the assembly of the secondary lattice structure 308 to the primary lattice structure 306. The locating and mounting features may include a locating ridge that is preferably stamped or cut into the main face 330 of the primary lattice structure 306 that receives the secondary side face 338. Once located, the secondary side face 338 may be attached to the main face 330 by a welding process or any other suitable method. Alternatively, as shown in FIG. 10, the secondary side face 308 may include locating tabs 305 and the main face 330 may include slot features 307 that receive the locating tabs 305. The locating tabs 305 may then be secured within the slot features 307 by a welding process or any other suitable method. Alternatively, the secondary side face 338 may include locating tabs 305 and welding tabs 309, where the locating tabs 305 function to locate the secondary lattice structure 308 with respect to the primary lattice structure 306 and the welding tabs 309 function to provide a surface area for a welding process or any other suitable method to attach the two lattice structures 306 and 308. However, notches, holes, pegs, screws, bolts, latches, adhesive (such as epoxy) or any other suitable mechanical locating and attachment feature may be used. The locating and mounting features are preferably formed into the primary and secondary lattice structures 306 and 308, but may alternatively be molded, welded, bolted, or attached to the lattice structures 306 and 308 using any other suitable secondary manufacturing process. Similarly, when appropriate for the application, the frame 300 may be appended to accommodate for triple, quadruple, or a combination of any other number of lattice structures to accommodate additional layers of battery packs 100.

As shown in FIGS. 8-10, the frame 300 of the preferred embodiment is constructed using sheet metal, allowing the frame 300 to remain relatively light. The sheet metal is preferably stamped or machined to the geometry of the main faces 330, secondary faces 340, side faces 332 and 338, and any other alignment, securing, or locating features. The main faces 330 and secondary faces 340 preferably undergo a stamping process that cuts out the triangular geometry of the battery pack mounts 304. The stamping process may then be followed with a machining process that refines the geometry and/or adds additional tabs, holes, threaded holes, or any other features that are difficult to form through a stamping process. The side faces 332 and 338 preferably also undergo a stamping process to form a flat sheet of the appropriate size with the appropriate tabs or any other suitable feature. The stamping process then preferably followed by a shaping process to form the geometry of the perimeter of the tessellating triangular geometry and any other suitable shaped features (such as the welding tabs 309. However, any other suitable manufacturing process(s) may be used to form the components of the frame 300. The full frame assembly 300 is preferably assembled using electron-beam welding, but may alternatively be assembled using vacuum brazing, epoxy, fasteners, or any other suitable structurally reliable joining mechanism, method, or material. In other embodiments, other suitable materials that lightweight and structurally strong may be used. In yet other embodiments, other manufacturing processes may be used.

The frame 300 may also function to facilitate interchangeability between the battery packs through the symmetric and similar geometry throughout the frame. Battery packs 100 may be preferably removed, replaced, or relocated, which facilitates maintenance, repair, and continuous system optimization through the life of the ride-on vehicle 10. In the preferred embodiment, battery packs 100 are assembled into the frame 300 without the use of permanent glues and fixations, providing ease of maintenance and repair. The battery packs 100 are preferably held with shock absorbing foam to isolate vibrations or mechanical forces from the battery packs. Alternatively, the battery packs 100 may be reinforced and mechanically fixated to the frame 300 through a fastening mechanism to provide additional structural support for the frame 300. However, any other suitable non-permanent assembly method or material may be used. Alternatively, the frame 300 may also have asymmetric features that couple with corresponding asymmetric features on the battery pack 100 to provide differentiation in battery pack location in the frame 300. This may be useful if certain battery packs 100 are designed to perform better structurally, mechanically, electrically, or thermally in certain locations in the frame.

Figure 12:
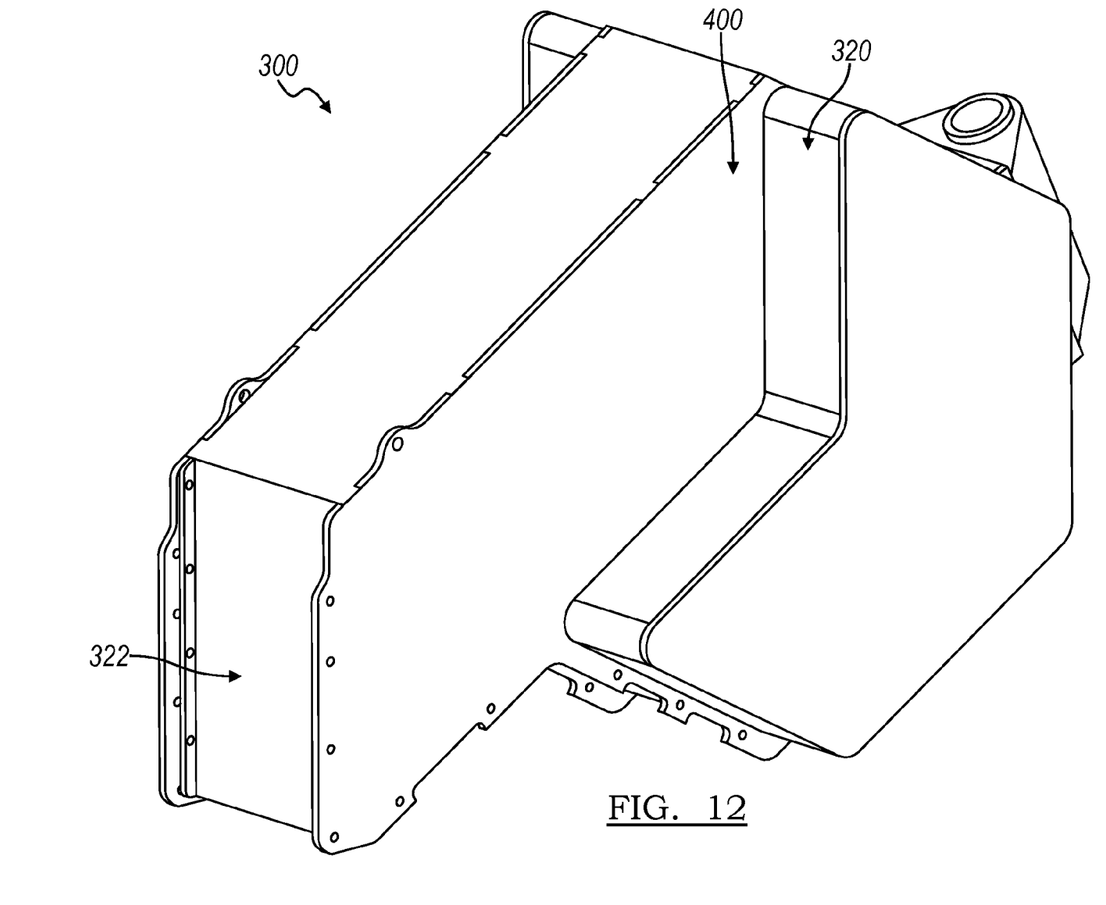
FIG. 12 is a detailed view of the end caps of the frame.

As shown in FIG. 12, the frame 300 of the preferred embodiment may also include end caps 400. The end caps 400 function to protect the battery packs from the outside environment and to prevent accidental contact between the rider and the battery packs. The end caps 400 are preferably assembled on both sides of the frame 300 using a non-permanent method or material, preferably a mechanical fastening mechanism such as bolts, slots and pins, latches, snaps, or any other suitable method or material. Alternatively, the end caps 400 may form a continuous case enveloping the frame. However, any other suitable arrangement of the end caps 400 may be used. The end caps 400 may also function to provide a substantial seal or hermetical seal around the battery packs within the frame. For example a sealing material such as rubber may be placed around the interface between the frame and the end cap to further isolate the battery packs from the ambient environment and provide a hermetic and waterproof seal. Alternatively, the interface between the main faces 330 and secondary faces 340 and the endplates of each of the battery packs may cooperate to from a substantial seal or a hermetic seal around the cells within the frame. In this variation, the frame 300 may include a conventional pressure sensor 410 (as shown in FIG. 6) within the frame to detect significant sudden increases of pressure due to a battery pack, module, or cell going through catastrophic failure. The frame 300 may also include a processor 420 (as shown in FIG. 6) that detects the source of the catastrophic failure and function to electronically decouple the battery pack, the module, and/or the cell that is undergoing catastrophic failure from the ride-on vehicle. The processor of this variation may alternatively be a processor that manages other functions within the motorcycle.

As a person skilled in the art will recognize from the previous detailed description and from the figures and claims, modifications and changes can be made to the preferred embodiments of the invention without departing from the scope of this invention defined in the following claims.

We claim:

1. A frame for a ride-on vehicle having at least one front wheel, at least one rear wheel, and a plurality of substantially similar battery packs, comprising: a frame defining a central plane and including a front end located adjacent to the front wheel(s), a rear end located adjacent to the rear wheel(s), and a lattice structure that extends substantially between the front end and the rear end, wherein the lattice structure includes a first portion that includes battery pack mounts that secure a first subset of the battery packs arranged in two layers, wherein the plurality of battery mounts each align and secure a battery pack transverely relative to the central plane and parallel to the ground, wherein the lattice structure includes a second portion that includes battery pack mounts that secure a second subset of the battery packs arranged in a single layer, and wherein the lattice structure defines a truss that mechanically couples the front wheel(s) to the rear wheel(s).

2. The frame of claim 1, wherein the frame is symmetric about the central plane.

3. The frame of claim 1, wherein the lattice structure defines a volume within the frame, and wherein the plurality of battery packs aligned and secured by the battery pack mounts occupy at least half of the volume defined by the lattice structure.

4. The frame of claim 3, wherein the battery packs aligned and secured by the battery pack mounts occupy at least 75% of the volume defined by the lattice structure.

5. The frame of claim 1, wherein the plurality of battery pack mounts defined by the lattice structure are each of a prismatic shape.

6. The frame of claim 5, wherein the plurality of battery pack mounts defined by the lattice structure are each of a triangular prismatic shape.

7. The frame of claim 1, wherein the lattice structure is composed of sheet metal.

8. The frame of claim 1, wherein the lattice structure includes fastening features to couple the plurality of battery packs to the plurality of battery pack mounts.

9. The frame of claim 8, wherein the fastening features include alignment features to align each of the plurality of battery packs to one of the plurality of battery pack mounts.

10. The frame of claim 1, further comprising a casing that envelops a substantial portion of the lattice structure.

11. The frame of claim 10, wherein the casing includes a first and second end cap, wherein the first end cap envelops the lattice structure on one side of the central plane and the second end cap envelops the lattice structure on the opposite side of the central plane.

12. The frame of claim 10, wherein the casing forms a hermetic seal around the plurality of battery packs.

13. The frame of claim 12, further comprising a pressure sensor contained within the casing that detects a pressure increase from a battery pack undergoing catastrophic failure.

14. The frame of claim 13, further comprising a processor that electrically decouples the battery pack undergoing catastrophic failure from the motorcycle.

15. A frame for a ride-on vehicle having at least one front wheel, at least one rear wheel, and a plurality of substantially similar battery packs, comprising: a frame defining a central plane and including a front end located adjacent to the front wheel(s), a rear end located adjacent to the rear wheel(s), and a lattice structure that extends substantially between the front end and the rear end, wherein the lattice structure includes a first portion that includes opposing battery pack mounts that align and secure two layers of battery packs transversely relative to the central plane and parallel to the ground in opposing directions, wherein the lattice structure includes a second portion that includes battery pack mounts that secure a second subset of the battery packs arranged in a single layer, and wherein the lattice structure defines a truss that mechanically couples the front wheel(s) to the rear wheel(s).

16. The frame of claim 15, wherein the frame is symmetric about the central plane.

17. The frame of claim 15, wherein the lattice structure defines a volume within the frame, and wherein the plurality of battery packs aligned and secured by the battery pack mounts occupy at least half of the volume defined by the lattice structure.

18. The frame of claim 17, wherein the battery packs aligned and secured by the battery pack mounts occupy at least 75% of the volume defined by the lattice structure.

19. The frame of claim 15, wherein the plurality of battery pack mounts defined by the lattice structure are each of a prismatic shape.

20. The frame of claim 19, wherein the plurality of battery pack mounts defined by the lattice structure are each of a triangular prismatic shape.

21. The frame of claim 15, wherein the lattice structure is composed of sheet metal.

22. The frame of claim 15, wherein the lattice structure includes fastening features to couple the plurality of battery packs to the plurality of battery pack mounts.

23. The frame of claim 22, wherein the fastening features include alignment features to align each of the plurality of battery packs to one of the plurality of battery pack mounts.

24. The frame of claim 15, further comprising a casing that envelops a substantial portion of the lattice structure.

25. The frame of claim 24, wherein the casing includes a first and second end cap, wherein the first end cap envelops the lattice structure on one side of the central plane and the second end cap envelops the lattice structure on the opposite side of the central plane.

26. The frame of claim 24, wherein the casing forms a hermetic seal around the plurality of battery packs.

27. The frame of claim 26, further comprising a pressure sensor contained within the casing that detects a pressure increase from a battery pack undergoing catastrophic failure.

28. The frame of claim 27, further comprising a processor that electrically decouples the battery pack undergoing catastrophic failure from the motorcycle.

29. A frame for a ride-on vehicle having at least one front wheel, at least one rear wheel, and a plurality of substantially similar battery packs, comprising: a frame defining a central plane and including a front end located adjacent to the front wheel(s), a rear end located adjacent to the rear wheel(s), and a lattice structure that extends substantially between the front end and the rear end, wherein the lattice structure includes a first portion that includes battery pack mounts that secure a first subset of the battery packs arranged in two layers, wherein the lattice structure includes a second portion that includes battery pack mounts that secure a second subset of the batter packs arranged in a single layer, and wherein the lattice structure defines a truss that mechanically couples the front wheel(s) to the rear wheel(s), wherein the lattice structure includes a primary lattice structure and a secondary lattice structure that is coupled to the primary lattice structure at the first portion of the lattice structure, wherein the primary lattice structure and the secondary lattice structure cooperate to align and secure two layers of battery packs.

30. The frame of claim 29, wherein the secondary lattice structure includes two segments, wherein one segment is coupled to the primary lattice structure on one side of the central plane and the other segment is coupled to the primary lattice structure on the opposite side of the central plane.

31. The frame of claim 30, wherein the two segments of the secondary lattice structure are substantially identical.

32. The frame of claim 30, wherein the lattice structure defines a volume within the frame, and wherein the plurality of battery packs aligned and secured by the battery pack mounts occupy at least half of the volume defined by the lattice structure.

33. The frame of claim 32, wherein the battery packs aligned and secured by the battery pack mounts occupy at least 75% of the volume defined by the lattice structure.

34. The frame of claim 29, wherein the frame is symmetric about the central plane.

35. The frame of claim 29, wherein the plurality of battery pack mounts defined by the lattice structure are each of a prismatic shape.

36. The frame of claim 35, wherein the plurality of battery pack mounts defined by the lattice structure are each of a triangular prismatic shape.

37. The frame of claim 29, wherein the lattice structure is composed of sheet metal.

38. The frame of claim 29, wherein the lattice structure includes fastening features to couple the plurality of battery packs to the plurality of battery pack mounts.

39. The frame of claim 38, wherein the fastening features include alignment features to align each of the plurality of battery packs to one of the plurality of battery pack mounts.

40. The frame of claim 29, further comprising a casing that envelops a substantial portion of the lattice structure.

41. The frame of claim 40, wherein the casing includes a first and second end cap, wherein the first end cap envelops the lattice structure on one side of the central plane and the second end cap envelops the lattice structure on the opposite side of the central plane.

42. The frame of claim 40, wherein the casing forms a hermetic seal around the plurality of battery packs.

43. The frame of claim 42, further comprising a pressure sensor contained within the casing that detects a pressure increase from a battery pack undergoing catastrophic failure.

44. The frame of claim 43, further comprising a processor that electrically decouples the battery pack undergoing catastrophic failure from the motorcycle.

* * * * *